Figure 1:
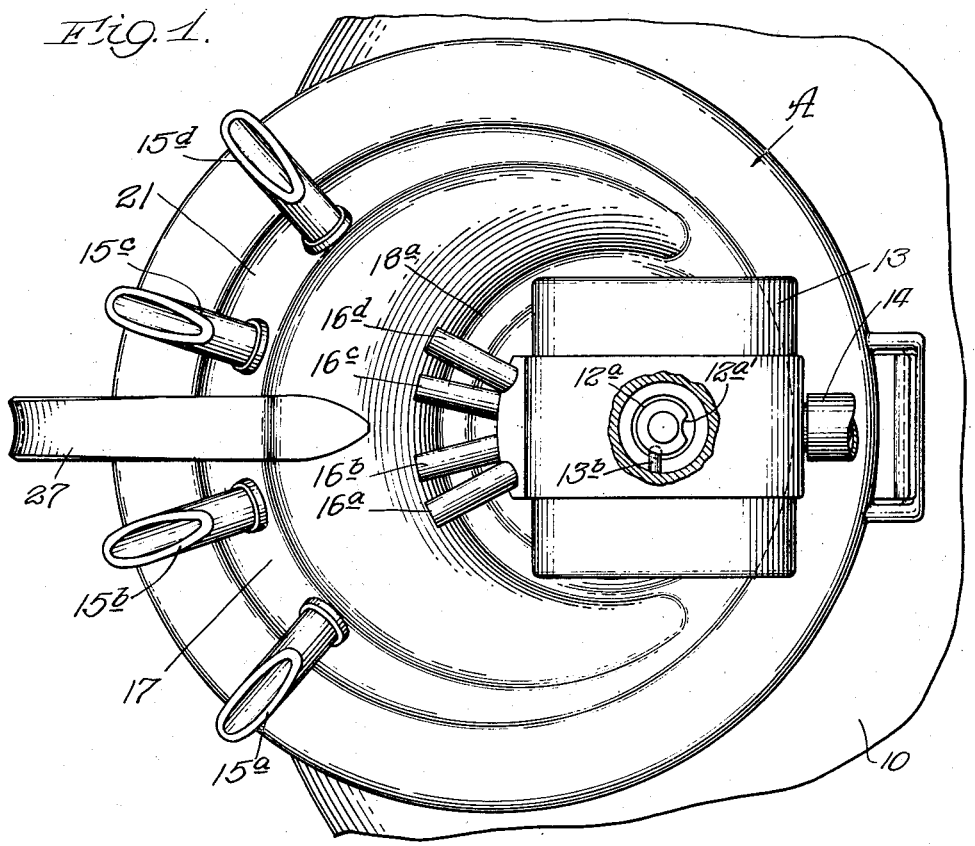

Sept. 16, 1952   C. A. THOMAS   2,610,609
SUSPENDED MILKER

Filed Feb. 18, 1948   2 SHEETS—SHEET 1

Inventor:
Chester A. Thomas,
By Chritton, Schroeder, Merriam & Hofgren,
Attys.

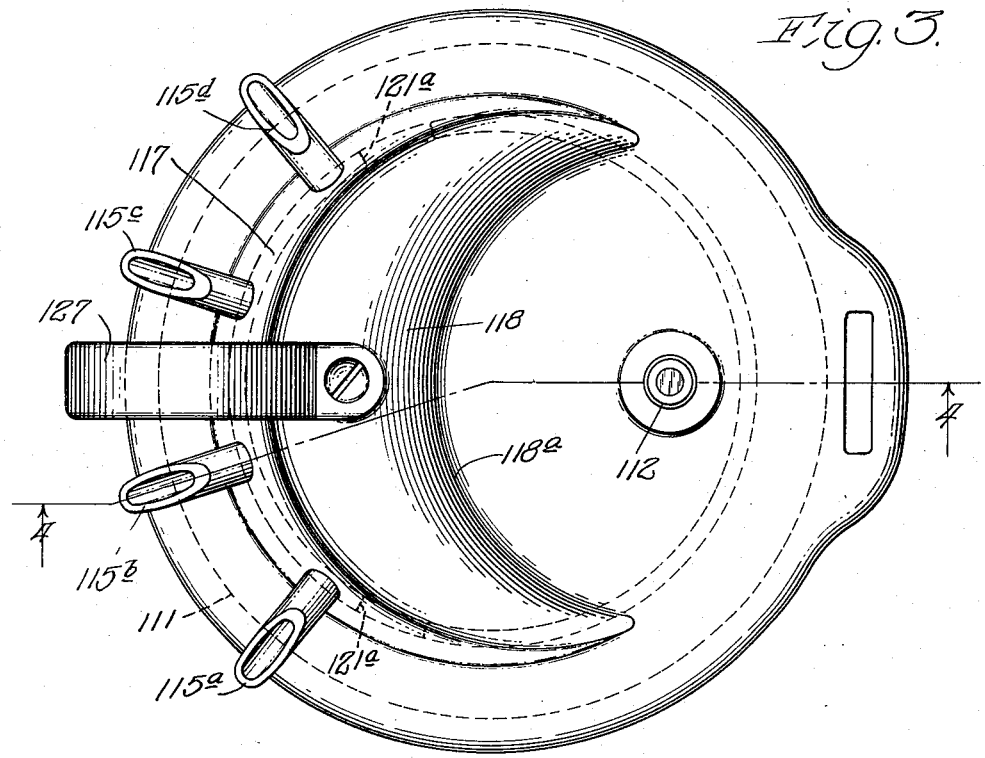

Patented Sept. 16, 1952

2,610,609

UNITED STATES PATENT OFFICE 2,610,609

SUSPENDED MILKER

Chester A. Thomas, Lake Forest, Ill., assignor to Babson Bros. Co., a corporation of Illinois Application February 18, 1948, Serial No. 9,088

8 Claims. (Cl. 119—14.54)

This invention relates to a suspended milker, and more particularly to an improved lid for such a milker.

The milkers with which I am here concerned are of the type adapted to be suspended beneath the cow. Since milkers of this general type have been in commercial use for more than two decades their general construction and suspension is not illustrated, and reference may be had to other issued patents to supplement the present disclosure if desired, as for example McCornack Patent 1,859,213.

The pail or bucket of a suspended milker generally comprises a round vessel adapted to receive in the neighborhood of forty or fifty pounds of milk, with an opening in the top having a diameter in the neighborhood of half that of the milker diameter. This opening, during milking, is closed by a lid which carries the pulsator, provides the vacuum passageway to the interior of the milker, and has connector nipples for the inflations or flexible lining members in the teat cup shells, another set of connections being made from the shells to the pulsator. In accordance with conventional double acting milking machine operation, a vacuum is then pulled steadily on the ends of the teats from the interior of the milker pail, while vacuum and atmospheric pressure are automatically intermittently applied between the shell and inflation.

As has been fully set forth in the abovementioned and other McCornack patents, milkers of the suspended type with which I am here concerned, when properly suspended and operated, provide an intermittent downward and forward tug and pull on the teats during milking. In order to enable this pull to be correctly applied the connector nipples must enter the lid at a rather small angle to the general plane of the lid, which is substantially horizontal when the milker is in operation, past work having indicated an angle of about 22½° to be a desirable angle between the axes of the generally tubular connector nipples and the general plane of the lid.

Milkers of this type have heretofore been subject to the difficulty of small quantities of milk getting up past the check valve in the vacuum passageway, into the vacuum hose, and even into the vacuum line or pipe to which the hose is connected. In addition to the clogging resulting in the vacuum hose and pipe because of milk getting into these elements, milk in the vacuum hose or pulsator passageways sometimes gets back past the check valve and into the milk in the pail, resulting in considerable increase in bacterial count, since the pulsator, and frequently also the vacuum hose, are parts which are not washed after each milking.

I have recently discovered the cause of milk getting past the check valve and into the vacuum hose, and means for preventing this undesired occurrence. I have found that, for all practical purposes, all of the milk which heretofore got into the vacuum passageway has been swept along the undersurface of the lid by a stream of air flowing along such undersurface from the connector nipples to the vacuum passageway, this being air which leaks around the teats and passes between them and the inner walls of the inflations. Moreover, I have devised barrier and drip arrangements, as illustrated here, and new lid constructions, which not only obviate this difficulty but also provide other advantages.

The principal feature of this invention is the provision of barrier means preventing flow of milk along the undersurface of the lid from the connector nipples to the vacuum passageway; another feature of this invention is the provision of one or more downwardly extending drip-facilitating edges between the connector nipples and the vacuum passageway, and preferably entirely around the latter; yet another feature of this invention is the shaping of a section of the lid so that the connector nipples enter the wall in which they are mounted at right angles, while maintaining the desired small angle between the nipple axes and the general plane of the lid, with the arrangement being such as to facilitate cleaning; a further feature of this invention is that a lid embodying one or more of the abovementioned features may be made of a transparent plastic or the like to facilitate view of the milk as it enters the pail; still another feature of this invention is the provision of a protecting drip ring substantially entirely around the lid near its outer edge, serving to keep milk from getting under the lid gasket; a further feature of this invention is the provision of an improved seal between the pulsator and the vacuum passageway through the pulsator post on the lid; and yet another feature of this invention is the provision of an improved check valve which not only performs its valve operation better but which is also easier to clean, and which facilitates cleaning of the vacuum passageway in the lid.

Figure 2:
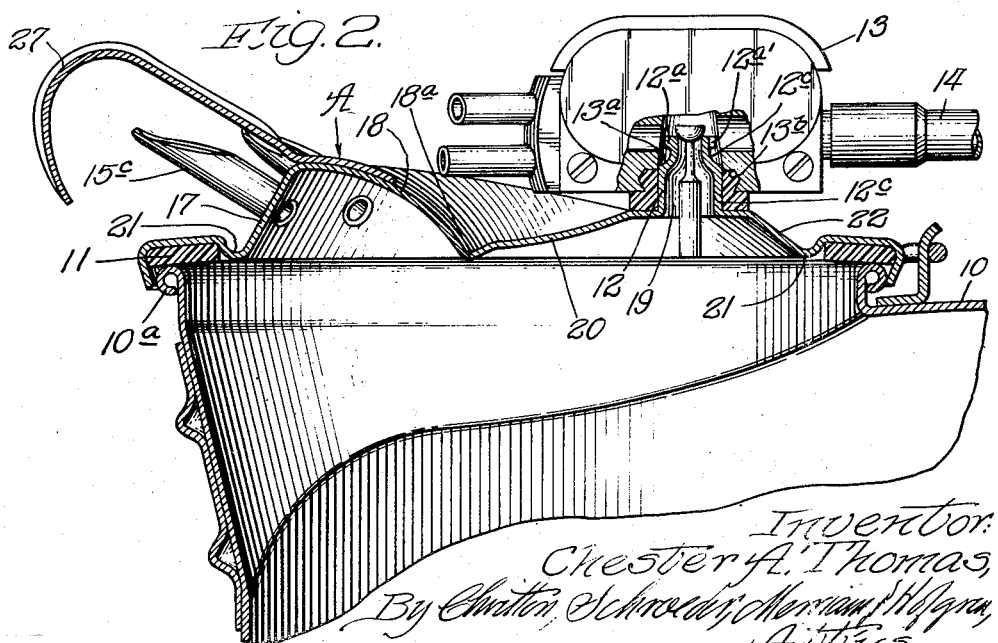

Other features and advantages of this invention will be apparent from the following specification and the drawings, in which:

Figure 1 is a top plan view of a lid embodying my inventions, together with a pulsator and a fragmentary portion of the pail of the suspended milker with which the lid is associated; Figure 2 is a vertical sectional view of the parts shown in Figure 1; Figure 3 is a top plan view of a lid comprising another modification or embodiment of my inventions; Figure 4 is a vertical sectional view of the lid shown in Figure 3; and Figure 5 is a vertical sectional view of still another form of lid embodying my inventions.

In the embodiment of my inventions illustrated in Figures 1 and 2, the milker pail 10, which is preferably circular in horizontal cross section (as illustrated for example in McCornack Patent No. 1,859,213), has in the top thereof an opening surrounded by the rolled bead or flange 10a. The opening in the pail is closed by the lid here identified in general as A, the lid illustrated in the first two figures being of formed sheet metal, preferably stainless steel. Extending completely around the outer edge the lid is formed into a channel providing a recess in the undersurface receiving the gasket 11, which serves to provide a vacuum-tight seal between the lid and pail during use of the milker.

The front portion of the lid is provided with a pulsator post 12 which supports the pulsator 13 and which acts as a vacuum passageway between the interior of the pail and passageways in the pulsator communicating with the vacuum hose 14 which is connected to a stall cock in the vacuum line, or to any appropriate source of vacuum. The rear portion of the lid is provided with connector nipples 15a-d. In operation the ends or tips of the inflations are slipped over the generally tubular connector nipples 15 and other tubes connect the shells to the pulsator, as by being slipped over the connector elements 16a-d. The handle 27 facilitates handling of the lid.

When portions of the lid are spoken of as "front" and "rear" portions, these terms are being used in relation to the cow. That is, the portion of the lid here being termed the "front" portion is that which is nearest to the front of the cow when the milker is suspended in operative position; and the portion being termed the "rear" portion is that closest to the udder in such case.

The connector nipples 15 must be set at a small angle to the general plane of the lid in order to provide the proper direction of pull on the teats, and to facilitate cut-off of the vacuum when one or more of the shells is removed from a teat and dropped. The main body of the connector nipples is generally tubular, and it has been found desirable in practice to set them at an angle of about 22½° to the general plane of the lid. While the nipple angle shown in the above mentioned McCornack Patent 1,859,213 was somewhat greater than this, commercial suspended milkers have for some time been made with the even smaller angles specifically mentioned immediately above. Where the connector nipple has been mounted directly in the lid, however, as is the only practical and satisfactory way, this small entry angle presented problems both in mounting (generally affected by welding) and in cleaning.

I have found that I can provide a greatly improved mounting connection between the nipples and the lid, obviating the danger of small cracks or blow-holes at the point of welding (which became bacteria catch points), and greatly improving the ease of cleaning, in the manner disclosed here. As can be best seen in Figure 2, a section of the rear portion of the lid (here identified as 17) is formed to extend upwardly with respect to the general plane of the lid at an angle which is a complement to the angle at which it is desired to have the axes of the nipples. In the case mentioned, with the nipple axes extending to the rear at 22½° to the general plane of the lid (the plane across the top of the bead 10a on which the lid rests), this wall 17, while arcuate in shape, should at any given section point incline to the front at an angle of 67½° to the general plane of the lid. This enables the tubular body portions of the nipples 15 to be mounted in the section 17 at right angles to the wall at their point of mounting. This not only facilitates a perfect weld (which can be difficult when working with stainless steel), but also provides a smooth inner surface such that when a large brush is used on the inner surface of the wall section 17 there are no recessed portions of the surface which tend to be left uncleaned, the interiors of the nipples being cleaned by a small circular brush. This is not the situation with milker lids being used commercially at present, which have depressions in the lid adjacent the point of entry of the connector nipples which cannot be readily cleaned either by running a small brush through the nipples or by sweeping a large brush across the undersurface of the lid.

Connecting with the lid section 17 and to the front thereof (to the right as the parts are viewed in Figure 2) is another generally angularly arranged (although preferably slightly curved) section identified as 18. This section has several important functions. First, it, and more particularly its lower edge or junction point with the remaining portions of the lid (forming an arcuate apex line here identified as 18a) form barrier means between the connector nipple openings and the vacuum passageway 19 through the pulsator post 12. Second, by making this section 18 at an angle to the general plane of the lid smaller than that of the section 17, plenty of space is provided for convenient access of a relatively large brush into the space between the undersides of these sections. The primary function of the relatively sharp apex or angle 18a between the junction of the wall section 18 and the adjacent section 20 is primarily to provide a drip edge or apex facilitating dripping of milk therefrom; but it and the slight curvature of the section 18 also have a function in strengthening the lid.

Extending entirely around near the outer edge of the lid, just to the inside of the channel receiving the gasket 11, is another apex or drip edge here identified as 21. As may be best seen in Figure 1, the arcuate portion 18a joins with the front portion of this drip edge 21 to form a drip ring extending entirely around the vacuum passageway 19 through the post 12. Moreover, the undersurface of the lid slopes upwardly at all points from the drip ring thus formed to the bottom of the vacuum passageway 19, the angle of the front section 22 being somewhat greater than that of the section 20 because the pulsator post and vacuum passageway are not, in the form here illustrated, exactly centered in the drip ring surrounding the passageway; but I prefer to have the angle of the undersurface of the wall between any point in such drip ring and the bottom of the vacuum passageway at least of the order of 15°.

The downwardly depending apex portion 18a provides barrier means extending entirely across the lid between the connector nipples and the vacuum passageway, with its drip edge well below a plane through the center of the nipple openings (at their point of juncture with the lid) and the bottom end of the vacuum passageway 19. Milk entering the pail during each cycle of pulsator operation enters through the nipples with quite a rush or jet effect, with a considerable component of velocity toward the front of the lid by reason of the small angle at which the connector nipples are mounted. Moreover, as I have discovered, this jet tends to fan out or "cone," and this has in the past resulted in the undersurface of the lid being wetted with milk substantially all over during the entire period of operation of the milker. The flow of air along the undersurface of the lid from the connector nipples to the vacuum passageway, aided by the forward component of the milk droplets striking the undersurface of the lid, has heretofore resulted in milk being carried to the bottom end of the vacuum passageway and being drawn up therein. The use of barrier means which I am illustrating, with the drip ring extending entirely around the vacuum passageway and the lid sloping upwardly from such drip ring to the bottom end of the passageway, results in obviating this difficulty. In many tests with this type of lid I have found that the undersurface of the lid for a substantial space around the bottom end of the vacuum passageway remains completely dry; and, with the exception of one instance where a trace of milk appeared in the vacuum hose as the result of some exceptional condition, I have never found milk in the pulsator or vacuum hose in a very considerable number of test milkings with a milker having this lid.

When I speak of a drip ring around the vacuum passageway, it will be understood that I use the word "ring" in the broad sense of any drip edge which surrounds the passageway, and not with any intent to limit the shape to a true circle, as the configuration may be oval, elliptical or in fact almost any shape providing a closed figure.

Referring now more particularly to the front portion of the lid, to the right as viewed in Figure 2, the pulsator seal and the check valve arrangement associated with my pulsator post 12 also embody substantial improvements, and these will now be described.

Referring now particularly to Figure 2, it will be seen that the pulsator 13 is provided with a downwardly extending central bore or passageway adapted to receive the pulsator post 12, this bore being here identified as 13a. It tapers in somewhat at the top to closely receive the upper flange portion 12a of the pulsator post, this being circular except for the notch 12a' best seen in Figure 1. When the pulsator 13 is being put in operative position on the milker lid it would be put down over the post 12 in a position 90° counterclockwise from that shown in Figure 1, so that the pin 13b passes by the flange 12a in the notched portion thereof, and then the pulsator is turned to the position illustrated in Figure 1, resulting in a positive locking of the pulsator on the post by virtue of the engagement of the pin with the underside of the flange 12a. Below the reduced neck portion 12b of the post (provided to permit rotation of the pin below the flange) the post has a lower cylindrical portion 12c of substantial diameter. The pulsator carries an annular seal or gasket 24 having what may be termed a generally L-shaped section. The upwardly extending portion of this gasket 24 is received in a recess or groove 13b, which is V-notched in its outer wall, the adjacent portion of the gasket 24 having a similarly formed section so that once it is snapped in place it remains with the pulsator during removal and replacement thereof. The horizontally extending, or lower portion of the gasket 24 extends out beneath the bottom surface of the pulsator to some extent, and the parts are so proportioned that the gasket, of a resilient material such as synthetic rubber, must be compressed slightly in order for the pin to turn beneath the flange 12a. There is thus not only a seal between the outer surface of the section 12c of the pulsator post and the gasket, but also a positively compressed seal between the bottom of the pulsator and the annular section of the upper surface of the lid immediately around the pulsator post, this small annular section of the lid being perpendicular to the axis of the post 12. The result is an extremely good vacuum seal which maintains its desired tightness even after long and hard usage. Moreover, since the interior of the bore 13a lies very closely adjacent the flange 12 at the top of the post, any tendency of the pulsator to rock back and forth is eliminated.

Turning now to the check valve, here identified in general as 25, it will be seen that this comprises an upper valve head 25a, a relatively slender stem or connecting portion 25b and a relatively heavy lower cylindrical portion 25c. The head portion 25a is preferably of synthetic rubber or equivalent material, as I have found that a metal check valve has a tendency to leak under the conditions encountered in use of milkers of the type with which I am here concerned; and the portions 25b and 25c are preferably of stainless steel. The slender stem portion 25b provides plenty of space therearound for passage of air through the upper smaller portion of the passageway 19 during operation of the milker, while the lower cylindrical portion 25c of greater diameter provides sufficient weight, in relation to the area of the top shoulder or seat on which the valve member 25a seats, to cause the check valve to operate at a pressure differential preferably amounting to about ¾ of an inch to an inch of mercury. In operation it is normal to have the vacuum pump and vacuum line under a vacuum corresponding to about 15 inches of mercury, and under these conditions the somewhat lesser vacuum existing in the bucket (the differential being that necessary to lift the valve) would be between 14 and 14¼ inches.

The principal feature of my new check valve is its proportioning and design such that sufficient weight depends well below the valve head to insure proper operation, yet such that the diameter of all parts below the head is less than that of the smallest diameter of the passageway through the pulsator post, so that the valve can be removed from the lid, after the pulsator has been removed, merely by grasping it by the head and lifting it up, the lower cylindrical portion 25c coming up through the post readily. This is of great importance in insuring proper cleanliness of the valve and of the interior of the pulsator post, since when the valve has been removed it can be washed with ease, and the passageway through the pulsator post can be readily cleaned with a brush of the type used for cleaning the inflation tubes and the connector nipples. To the best of my knowledge all previous weight actuated check valves in milkers have been of such construction as not to be readily removable from the lid, and such as to hinder full and proper cleaning of the lid.

Since there is an ever increasing emphasis on a low bacteria count in milk, such improvements as I have here disclosed which facilitate cleaning both around the connector nipples and in and around the vacuum passageway are of considerable importance in the production of high quality milk.

Referring now to Figures 3 and 4, another modification of my inventions will be illustrated. The lid shown in these figures is preferably of a transparent plastic which enables the operator to readily watch the flow of milk from each quarter of the udder during milking, the lid being used in conjunction with a standard stainless steel bucket. The plastic of which the lid is formed, in addition to being transparent, should be impervious and unaffected by milk, non-shattering, unaffected by hot or boiling water or by the cleaning compounds which may be used, and non-cold-flowing. Such a material, for example, is the acrylic resin thermoplastic sold under the trade name of "Plexiglas." This modification or form of improved lid has not only the advantages described in more detail in connection with the first form, but incorporates even increased protection against undesired flow of milk from the nipples to the vacuum passageway by providing barrier means comprising two drip edges on the lower surface.

In order to facilitate reference back to earlier portions of the specifications if desired, reference numerals used on corresponding parts of the lid here being described will be one hundred higher than those heretofore used for analogous parts. The lid, here identified in general as A, again includes a channel or recess around its outer edge in the lower surface receiving the gasket 111; and it is provided with a pulsator post identified in general as 112. This post is preferably of metal and may be provided with a knurled lower end to insure a tight and rigid bond between it and the thermoplastic material in which it is set. Connector nipples 115a–d, also shown as provided with knurled ends, are set in a wall section 117 which extends upwardly from the general plane of the lid at an angle which is a complement of the angle of the connector nipple axes. The lid section 117 and the adjacent lid section 118 again provide an arrangement wherein the nipples enter the wall section in which they are mounted at right angles and wherein the undersurface at their point of entry may be readily cleaned. The lid section 118 drops down to a barrier means or depending drip apex 118a which, as may be best seen in Figure 3, extends entirely across the milker lid between the connector nipples and the pulsator post or vacuum passageway member 112. In addition, this latter is surrounded by another depending edge forming a drip ring 130, there thus being a double barrier to milk which might tend to flow across the undersurface of the lid toward the vacuum passageway.

Just to the inside of the gasket 111 is provided a drip ring or depending annular apex here identified as 121. However, in the case of the lid here being shown, this drip ring is broken or recessed at two points, here identified as 121a and 121b. These breaks or notches are provided to facilitate removal of the gasket, the breaks in the ring being preferably slightly wider than a finger so that the gasket may be readily snapped out of its recess during the washing operation. The breaks in the drip ring are so small, however, compared to the total circumference of the drip ring, that there is very little space for milk to get in under the gasket.

Referring now to Figure 5, another form of metal lid is shown which is somewhat similar to that illustrated in Figures 1 and 2 and described fully earlier. It differs from the first form principally in the provision of a drip edge or drip ring around the vacuum passageway which is lower to the front of the lid than to the rear thereof, so that any milk collecting on the drip ring tends to work around this edge to the front of the lid (out of the flow of air from the nipples to the vacuum passageway) and drop off there without any tendency to be blown or forced onto a surface of the lid leading toward the vacuum passageway.

Referring now to this last form of lid, and using reference numerals two hundred higher for parts analogous to those shown in Figures 1 and 2, it will be seen that the lid has a section 217 meeting a section 218, and that the latter, at the point of juncture with the section 220, provides a drip edge 218a somewhat lower and more accentuated than that in the first described form. To the other side of the vacuum post 212 (to the right as viewed in Figure 5), the section 222 drops at a quite sharp angle and to a greater extent to form, in conjunction with the section 232, a front drip edge 221 which is substantially lower (when the general plane of the lid is horizontal) than the drip edge 218a. This construction results in milk droplets which form on the edge 218a and which do not immediately drop therefrom running around to the lower drip edge portion 221 where they are out of the path of air flowing from the nipples 215 to the vacuum passageway 219, and where they may gather to a size sufficient to drip off without any tendency to be forced toward the vacuum passageway.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A lid for a suspended milker, comprising a rear portion having connector nipples mounted therein and opening therethrough, said connector nipples being generally tubular and having their axes at a small angle to the general plane of the lid, the lid having a portion in which the nipples are mounted so inclined to said general plane that the axes of the nipples are substantially perpendicular thereto, and a front portion having a vacuum passageway opening therethrough, said lid having a configuration to provide a downwardly extending drip ring around said passageway, the lid sloping gradually from the portion in which the nipples are mounted to the drip ring to provide easy cleaning access to said nipples and the undersurface of the lid therearound.

2. An integral sheet metal lid for a suspended milker, comprising a rear portion having connector nipples mounted therein and opening therethrough, said connector nipples being generally tubular and having their axes at a small angle to the general plane of the lid, the lid having a single arcuate portion in which the nipples are mounted so inclined to said general plane that the axes of the nipples are substantially perpendicular thereto, and a front portion having a vacuum passageway opening therethrough, said lid having a configuration to provide a downwardly extending drip ring around said passageway, the lid sloping gradually from the section in which the nipples are mounted to the drip ring to provide easy cleaning access to said nipples and the undersurface of the lid therearound, and at least the undersurface of said lid sloping downwardly in all directions from said vacuum passageway opening.

3. Apparatus of the character claimed in claim 1, wherein the lid is of transparent material.

4. A lid for a suspended milker, comprising a rear portion having spaced connector nipples mounted therein and opening therethrough, said connector nipples being generally tubular and having their axes at a small angle to the general plane of the lid, the lid having the portion in which all the nipples are mounted raised and of a single arcuate shape with the axis of each nipple being substantially perpendicular to a plane tangent to said raised portion at the point of connection of the nipple to said raised portion.

5. A lid for a suspended milker, comprising a rear portion having spaced connector nipples mounted therein and opening therethrough, said connector nipples being generally tubular and having their axes at a small angle to the general plane of the lid, the lid having the portion in which all the nipples are mounted raised and of a single arcuate shape with the axis of each nipple being substantially perpendicular to a plane tangent to said raised portion at the point of connection of the nipple to said raised portion, a front portion having a vacuum passageway opening therethrough, said passageway being located approximately between the ends of said arcuate portion, and a downwardly extending drip ring entirely around said passageway.

6. A lid for a suspended milker, comprising a rear portion having spaced connector nipples mounted therein and opening therethrough, said connector nipples being generally tubular and having their axes at a small angle to the general plane of the lid, the lid having the portion in which all the nipples are mounted raised and of a single arcuate shape with the axis of each nipple being substantially perpendicular to a plane tangent to said raised portion at the point of connection of the nipple to said raised portion, a front portion having a vacuum passageway opening therethrough, and a downwardly extending drip baffle means between said raised arcuate portion and said vacuum passageway opening.

7. A lid for a suspended milker, comprising a rear portion having a plurality of spaced connector nipples mounted therein and opening therethrough, said connector nipples being generally tubular and having their axes at a small angle to the general plane of the lid, the lid having the portion in which a plurality of the nipples are mounted raised and of a single arcuate shape with the axis of each nipple therein being substantially perpendicular to a plane tangent to said raised portion at the point of connection of the nipple thereto, the lid sloping relatively gradually from the portion in which the nipples are mounted to provide a readily accessible area of substantial size facilitating easy cleaning of the portion in which the nipples are mounted.

8. A lid for a suspended milker, comprising a rear portion having nipples mounted therein and opening therethrough, said nipples being generally tubular and having their axes at a small angle to the general plane of the lid, and a front portion having a vacuum passageway opening therethrough, said lid having a dome-like configuration with said vacuum passageway opening at the apex thereof and providing a structurally integral drip ring with a downwardly extending annular apex entirely around and substantially spaced from said vacuum passageway opening.

CHESTER A. THOMAS.

REFERENCES CITED

The following references are of record in the file of this patent:

UNITED STATES PATENTS

| Number | Name | Date |
|---|---|---|
| 917,386 | Webb | Apr. 6, 1909 |
| 1,121,261 | Lawrence | Dec. 15, 1914 |
| 1,647,971 | Schmitt | Nov. 1, 1927 |
| 1,653,753 | Babson | Dec. 27, 1927 |
| 1,786,846 | Hodsdon | Dec. 30, 1930 |
| 1,829,567 | Maynard | Oct. 27, 1931 |
| 1,849,672 | Jansson | Mar. 15, 1932 |
| 1,859,213 | McCornack | May 17, 1932 |
| 1,859,214 | McCornack | May 17, 1932 |
| 1,921,533 | Maynard | Aug. 8, 1933 |
| 2,032,375 | Moore | Mar. 3, 1936 |
| 2,116,705 | Marx et al. | May 10, 1938 |
| 2,304,746 | Anderson | Dec. 8, 1942 |
| 2,345,963 | Conde | Apr. 4, 1944 |
| 2,358,037 | Sunderland | Sept. 12, 1944 |
| 2,427,312 | Thompson et al. | Sept. 9, 1947 |
| 2,464,917 | Babson | Mar. 22, 1949 |

FOREIGN PATENTS

| Number | Country | Date |
|---|---|---|
| 25,905 | New Zealand | May 4, 1909 |
| 28,622 | Denmark | Oct. 3, 1921 |
| 32,152 | Denmark | Aug. 13, 1923 |